United States Patent
Sudo et al.

(10) Patent No.: US 11,592,887 B2
(45) Date of Patent: Feb. 28, 2023

(54) POWER CONTROL APPARATUS AND METHOD FOR POWER CONTROL

(71) Applicant: FUJITSU LIMITED, Kawasaki (JP)

(72) Inventors: Kiyoshi Sudo, Kuki (JP); Kazuya Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 17/319,125

(22) Filed: May 13, 2021

(65) Prior Publication Data
US 2022/0050516 A1 Feb. 17, 2022

(30) Foreign Application Priority Data
Aug. 11, 2020 (JP) .............................. JP2020-135997

(51) Int. Cl.
G06F 1/30 (2006.01)
H02J 9/06 (2006.01)
G06F 1/26 (2006.01)

(52) U.S. Cl.
CPC ................ G06F 1/30 (2013.01); G06F 1/263 (2013.01); H02J 9/06 (2013.01)

(58) Field of Classification Search
CPC .. G06F 1/30; G06F 1/263; G06F 1/324; H02J 9/06
See application file for complete search history.

(56) References Cited

U.S. PATENT DOCUMENTS

| | | | | |
|---|---|---|---|---|
| 6,691,248 | B1* | 2/2004 | Nishijima | G06F 1/30 714/22 |
| 11,048,311 | B1* | 6/2021 | Churnock | G06F 1/28 |
| 2003/0023888 | A1* | 1/2003 | Smith | G06F 1/263 713/300 |
| 2005/0071691 | A1* | 3/2005 | Pomaranski | G06F 11/2015 713/300 |
| 2009/0144578 | A1* | 6/2009 | Tatsumi | G06F 1/3296 713/340 |
| 2013/0317658 | A1* | 11/2013 | Takahashi | G05B 11/01 700/286 |
| 2013/0326527 | A1* | 12/2013 | Suzuki | G06F 1/3287 718/102 |

(Continued)

FOREIGN PATENT DOCUMENTS

JP 2001-178018 A 6/2001
JP 2013-25343 A 2/2013

*Primary Examiner* — Aurel Prifti
(74) *Attorney, Agent, or Firm* — Fujitsu Patent Center

(57) ABSTRACT

An apparatus includes: a memory and a first processor being configured to: control an operating frequency of a second processor connected to power supply devices that receive power from one or more power source systems to an operating frequency corresponding to a power value based on information on a number of power source systems and information on a number of uninterruptable power supplies connected to the power supply devices; and control, when the number of the power source systems is two or more and an uninterruptable power supply is connected to a power supply device in each of the power source systems, the operating frequency of the second processor to an operating frequency corresponding to a power value based on a number of power supply devices normally operating in a first power source system and a number of uninterruptable power supplies in a second power source system.

14 Claims, 11 Drawing Sheets

(56) References Cited

U.S. PATENT DOCUMENTS

| | | | |
|---|---|---|---|
| 2014/0249793 A1* | 9/2014 | Yanami | H02J 13/00002 703/18 |
| 2015/0121104 A1* | 4/2015 | Kinouchi | G06F 1/3206 713/322 |
| 2015/0153819 A1* | 6/2015 | Kodama | G06F 1/329 713/320 |
| 2019/0171277 A1* | 6/2019 | Satou | G06F 1/3206 |
| 2019/0235601 A1* | 8/2019 | Lee | G06F 1/324 |
| 2020/0042063 A1* | 2/2020 | Messick | G06F 1/263 |
| 2021/0048867 A1* | 2/2021 | Messick | G06F 1/28 |
| 2021/0149469 A1* | 5/2021 | Kuo | G06F 1/3206 |

* cited by examiner

FIG.8

| Power Reception System Number | Two-System Power Reception | | | One-System Power Reception | | |
|---|---|---|---|---|---|---|
| | Presence of UPS | Absence of UPS | | | | |
| Operable PSU Number | 2+2 | 2+2 | | 4 | 3 | 2 |
| UPS Number of the System | 1+1 | | | — | — | — |
| [Normal Power Supply] | [2.0kW+2.0kW] | [2.0kW+2.0kW] | | [4.0kW] | [3.0kW] | [2.0kW] |
| [Power Supply Within Ten Minutes From the Occurrence of Power Failure] | [2.0kW+1.0kW] | | | — | — | — |
| [Power Supply After Ten Minutes From the Occurrence of Power Failure] | [2.0kW] | | | — | — | — |
| Processor Operating Frequency [Consumption Power] | NORMAL 3GHz [1.5kW] WHEN POWER FAILURE 2GHz [1.0kW] | 2GHz [1.0kW] | | 3GHz [1.5kW] | 2GHz [1.0kW] | 1GHz [0.5kW] |
| Fan Rotation Speed [Consumption Power] | NORMAL 10,000 rpm [1.0kW] WHEN POWER FAILURE 7,000rpm [0.7kW] | 7,000rpm [0.7kW] | | 10,000rpm [1.0kW] | 7000rpm [0.7kW] | 3000rpm [0.3kW] |
| [Consumption Power of Remaining Components] | NORMAL [0.5kW] WHEN POWER FAILURE [0.3kW] | [0.3kW] | | [0.5kW] | [0.3kW] | [0.2kW] |
| Total Consumption Power | NORMAL [3.0kW] WHEN POWER FAILURE [2.0kW] | [2.0kW] | | [3.0kW] | [2.0kW] | [1.0kW] |

POWER CONTROL APPARATUS AND METHOD FOR POWER CONTROL

CROSS-REFERENCE TO RELATED APPLICATION

This application is based upon and claims the benefit of priority of the prior Japanese Patent application No. 2020-135997, filed on Aug. 11, 2020, the entire contents of which are incorporated herein by reference.

FIELD

The embodiment discussed herein is directed to a power control apparatus and a method for power control.

BACKGROUND

Some information processing apparatuses, such as servers and storage devices, have configurations in which power is received from two power source systems (hereinafter referred to as "two-system power reception") in order to avoid power interruptions due to failure of Power Supply Units (PSUs) or power failure. With this configuration, when an abnormality, e.g., power failure, occurs in one of the systems, an information processing apparatus can continue its operation by using the power supplied from the other normal system.

Here, a system may mean one power supply source or a power supply path (e.g., a line) connected to the power supply source. Accordingly, a two system may mean two power supply sources that are different from each other, or two power supply paths (e.g., lines) connected to different power supply sources.

In an information processing apparatus including 2×N (N is a natural number) PSUs and carrying out two-system power reception in which each system uses N PSUs, a scheme has been known which controls the clock (operating) frequency of the processor such that the processor can be cooled and operated with the power suppliable by N PSUs. For example, the information processing apparatus controls the operating frequency of the processor so that the power consumption of the processor does not exceed the power suppliable by the N PSUs. Consequently, the event of a power failure of one system, the information processing apparatus operates using power supply of the other system.
[Patent Document 1] Japanese Laid-open Patent Publication No. 2001-178018
[Patent Document 2] Japanese Laid-open Patent Publication No. 2013-25343

SUMMARY

According to an aspect of the embodiments, a power control apparatus includes: a memory; and a first processor coupled to the memory. The first processor is configured to: control an operating frequency of a second processor connected to a plurality of power supply devices that receive power from one or more power source systems to an operating frequency corresponding to a power value based on information related to a number of power source systems in the plurality of power supply devices and information related to a number of uninterruptable power supplies connected to the plurality of power supply devices; and control, in a case where the number of the power source systems is two or more and an uninterruptable power supply is connected to a power supply device in each of the power source systems, the operating frequency of the second processor to an operating frequency corresponding to a power value based on a number of power supply devices normally operating in a first power source system and a number of uninterruptable power supplies in a second power source system different from the first power source system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a power value setting table;

DESCRIPTION OF EMBODIMENT(S)

Figure 1:
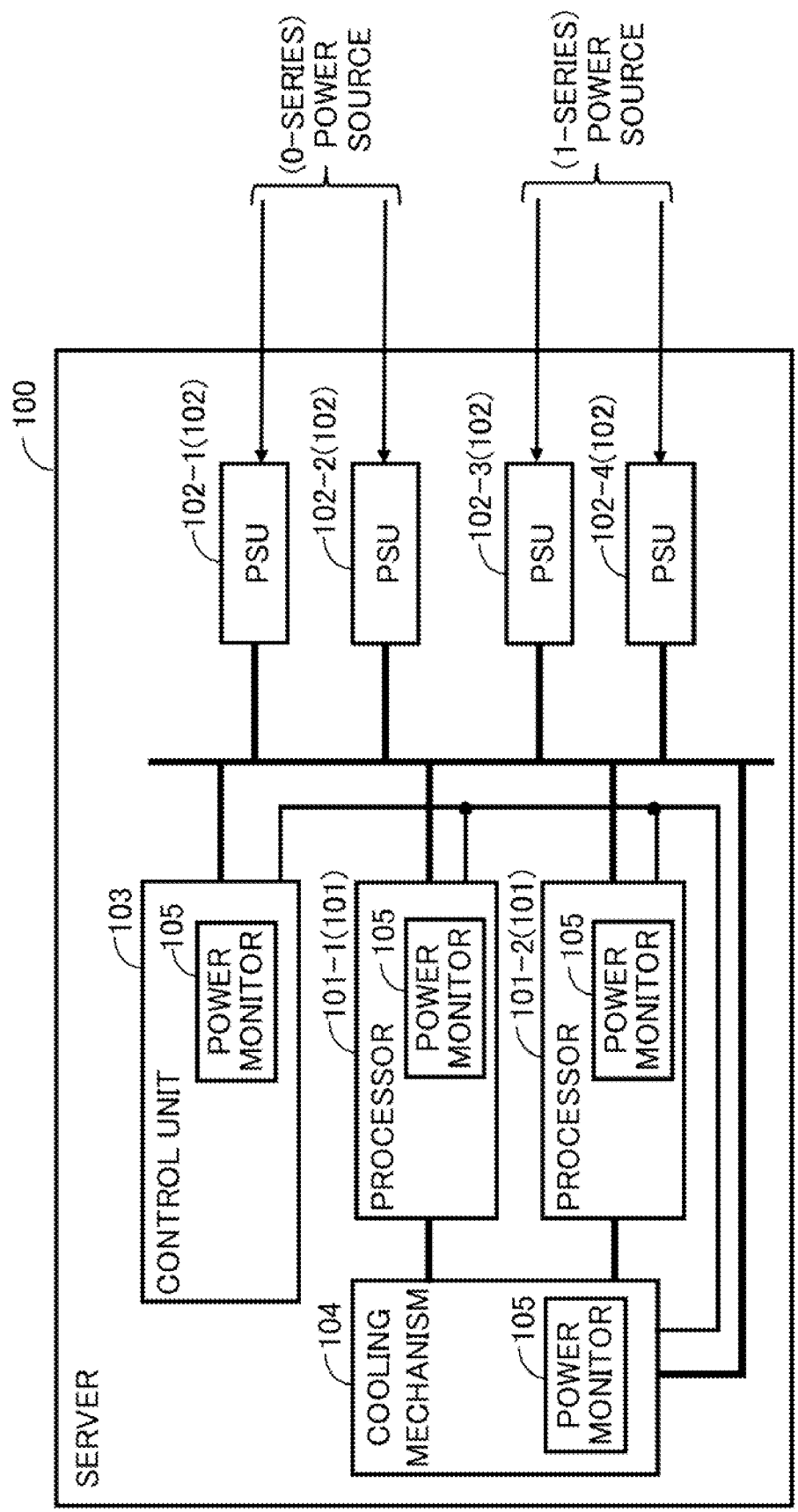
FIG. 1 is a block diagram illustrating an example of a hardware configuration of a server according to a comparative example.

Even if including 2N PSUs, the above information processing apparatus described above has difficulty in operating the processor using power exceeding the power suppliable by N PSUs due to, for example, the specifications or constraints described above. In other words, it is difficult to operate the processor with performance commensurate with the capability of a power supply apparatus connected to the information processing apparatus in some cases.

Hereinafter, an embodiment of the present invention will now be described with reference to the accompanying drawings. However, the embodiment described below are merely illustrative and there is no intention to exclude the application of various modifications and techniques that are not explicitly described below. For example, the present embodiment can be variously modified and implemented without departing from the scope thereof. In the drawings to be used in the following description, like reference numbers denote the same or similar parts, unless otherwise specified.

[1] One Embodiment

[1-1] Comparative Example

FIG. 1 is a block diagram illustrating an example of a hardware (HW) configuration of a server 100 according to a comparative example of one embodiment. The server 100 includes processors 101-1, 101-2, Power Supply Units (hereinafter referred to as "PSUs") 102-1 to 102-4, a control unit 103, and a cooling mechanism 104. Hereafter, the processor 101-1 and 101-2 are denoted to be the processors 101 when not being distinguished from each other, and likewise the PSUs 102-1 to 102-4 are denoted to be the PSUs 102 when not being distinguished from one another.

For the purpose of two-system power reception as a premise, the server 100 includes 2N PSUs 102 that are N+N redundant (where, N is the number of PSUs 102 per system). In the example of FIG. 1, the server 100 has four PSUs 102, i.e., for 2+2 redundancy (where N=2). Incidentally, in the example of FIG. 1, the PSU 102-1 and 102-2 are connected to a series-0 power source, and the PSU 102-3 and 102-4 are connected to a series-1 power source.

Each PSU 102 provides power supplied by a power source connected thereto to the components in the server 100 via a power supply path (see bold line in FIG. 1). The processors 101-1 and 101-2 according to the comparative example operate, when a power failure occurs in one of the two power source systems, i.e., the series-0 power source and the series-1 power source, using the power supplied from the two PSUs 102 connected to the other power source.

The processors 101, the control unit 103, and the cooling mechanism 104 each include a power monitor. In cases where the sum of the power consumption monitored by the respective power monitors 105 exceeds the value of ("the number of operating PSUs 102"×"the rated capacity of the PSU 102")/2, the control unit 103 determines that the configuration of N+N redundancy is impossible, and outputs a warning by, for example, displaying a warning on a monitor.

Thus, in the comparative example of FIG. 1, although the server 100 is provided with the facility of the two-system power reception, the N+N redundancy is determined to be impossible depending on the configuration of the processors 101, and the advantage of the two-system power reception is sometimes not obtained.

In addition, on the premise of such two-system power reception, the following description assumes that the power consumption of the processor is limited to the rated capacity of the N PSUs, which is allowed for the two-system power reception. In this case, the two-system power reception is not necessarily needed, and a user who can satisfactorily accept the N+1 redundancy is not allowed to use a processor that operates at a higher operating frequency by consuming more power than the limited power.

In addition, even in the two-system power reception is prepared for a power failure, occurrence of a power failure for a long time is rare. For example, the expected outage time is about one hour in five years. For this reason, the operating frequency of the processor of a server having a 2×N PSUs is limited in such a value that the processor can operate and be cooled, using power suppliable by N PSUs during the entire period except for an expected outage time (for example, the period excluding one hour of prospective outage in five years).

In addition, when a dedicated power supply facility with power failure countermeasures is used in advance at a data center or the like, it is sufficient to consider only failures among a power failure and failures of the PSU. However, even in this situation, the operating frequency of the processor is limited in such a value that the processor can operate and be cooled, using power suppliable by the N PSUs as described above.

As a solution to the above, description will now be made in relation to a method of enhancing the throughput of a processor connected to multiple PSUs.

[1-2] Example of Configuration of One Embodiment

For example, a power control apparatus according to one embodiment enhances the throughput of the processor by controlling the operating frequency of the processor according to the power value determined on the basis of the number of power reception systems 1o of the power supply units and the number of uninterruptible power supplies. Hereinafter, description will now be made in relation to the power control apparatus according to one embodiment.

Figure 2:
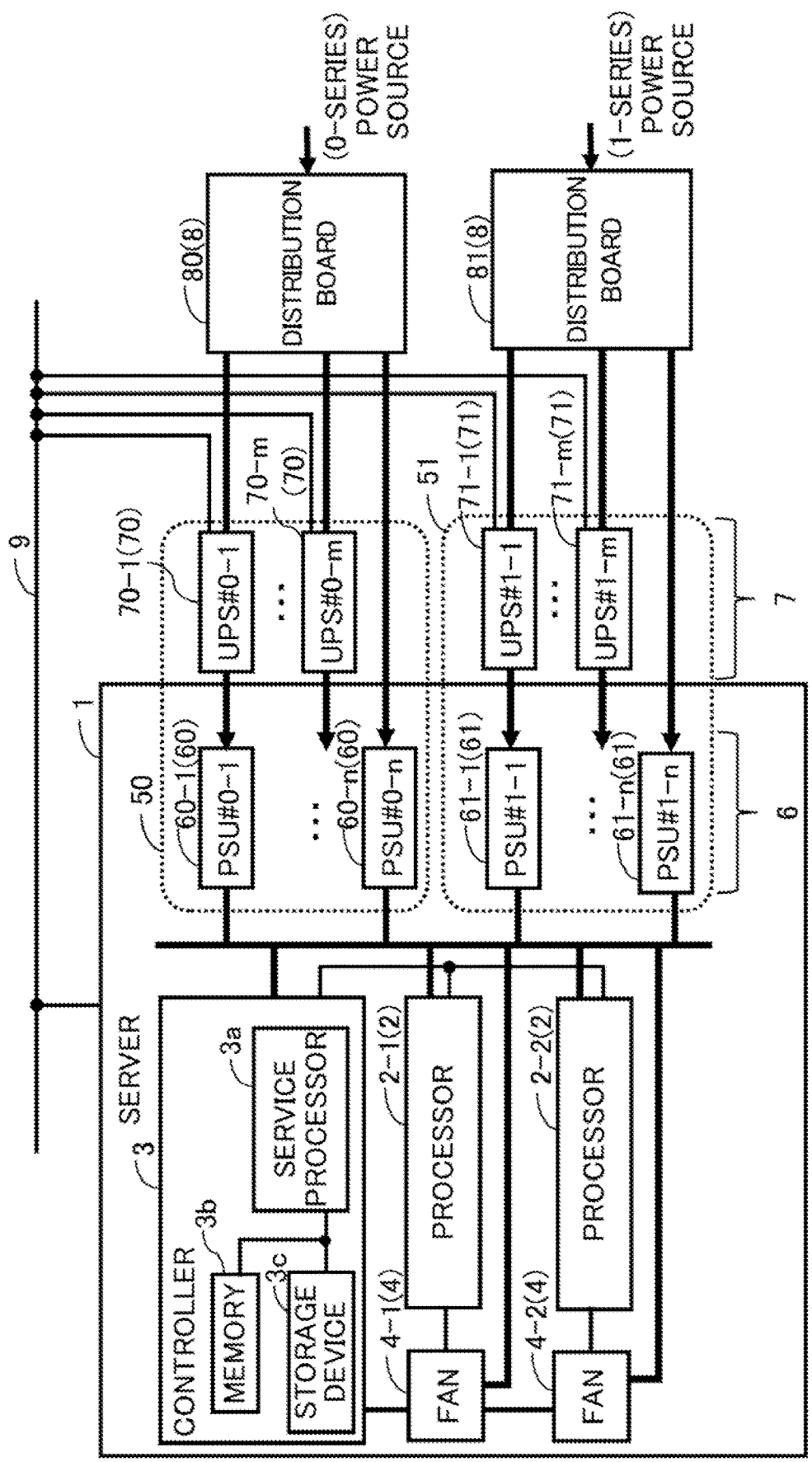
FIG. 2 is a block diagram schematically illustrating an example of a hardware configuration of a server according to one embodiment.

[1-2-1] Example of Hardware Configuration:

FIG. 2 is a block diagram schematically illustrating an example of a HW configuration of the server 1 according to one embodiment. The server 1 is an example of an information processing apparatus or a computer. The server 1 may receive power from multiple power source systems (commercial power supplies, AC power supplies), and in the example illustrated in FIG. 2, is assumed to receive power from two power source systems.

Focusing on the HW configuration related to power control, the server 1 may illustratively include processors 2-1 and 2-2, a controller 3, fans 4-1 and 4-2, and PSUs 60-1 to 60-$n$ and 61-1 to 61-$n$. The PSUs 60-1 to 60-$n$ and 61-1 to 61-$n$ may be connected to a power source (series-0 power source or series-1 power source) via Uninterruptible Power Supplies (UPSs) 70-1 to 70-$m$ and 71-1 to 71-$m$. At least one of the PSUs 60-1 to 60-$n$ and 61-1 to 61-$n$ may be connected to a power source without going through the UPSs 70-1 to 70-$m$ and 71-1 to 71-$m$. Each power source may be provided with distribution board 80 or 81.

In the following description, the processors 2-1 and 2-2 are denoted to be the processors 2 (second processor) when not being distinguished from each other, and likewise the fans 4-1 and 4-2 are denoted to be the fans 4 when not being distinguished from each other. In addition, the PSUs 60-1 to 60-$n$ are denoted to be the PSUs 60 when not being distinguished from each other, the PSUs 61-1 to 61-$n$ are denoted to be the PSUs 61 when not being distinguished from each other, and the PSUs 60 and 61 are denoted to be the PSUs 6 when not being distinguished from each other. In FIG. 2, the PSUs 60-1 to 60-$n$ are denoted to be the PSUs #0-1 to PSU #0-n, respectively, and the PSUs 61-1 to 61-$n$ are denoted to be the PSUs #1-1 to PSU #1-n, respectively. In addition, the UPSs 70-1 to 70-$m$ are denoted to be the UPSs 70 when not being distinguished from each other, the UPSs 71-1 to 71-$m$ are denoted to be the UPSs 71 when not being distinguished from each other, and the UPSs 70 and 71 are denoted to be the UPSs 7 when not being distinguished from each other. In FIG. 2, the UPSs 70-1 to 70-$m$ are denoted to be UPSS #0-1 to UPS #0-m, and the UPSs 71-1 to 71-$m$ are denoted to be UPSs #1-1 to UPS #1-m. When not being distinguished from each other, the distribution board 80 and 81 are denoted to be distribution boards 8.

Each processor 2 is an example of an Integrated Circuit (IC) that operates using power supplied to the server 1 in order to perform various controls and arithmetic operations, and is also an example of an operation processing device. The processor 2 may be a multi-core processor having multiple cores.

Examples of the processor 2 may be any one of Integrated Circuits such as a Central Processing Unit (CPU), a Micro Processing Unit (MPU), a Graphics Processing Unit (GPU), a Digital Signal Processor (DSP), an Application Specific Integrated Circuit (ASIC), and a Programmable Logic Device (PLD), such as (e.g., Field Programmable Gate Array (FPGA)), or a combination of two or more of these ICs.

The controller 3 is an example of a control device for monitoring, managing, and controlling various components in the server 1. Focusing on the function related to power control, the controller 3 is an example of a power control apparatus that controls the operating frequency of each processor 2 and the rotation speed of each fan 4, and the like. The controller 3 may include a Service Processor (SVP) 3a, a memory 3b, and a storage device 3c.

The service processor 3a (first processor) is an Integrated Circuit (IC) that performs various controls and arithmetic operations related to the power in the server 1. The service processor 3a is an example of a processor that performs power control in the controller 3.

The memory 3b is an example of a storage area and may include a storage area that stores a program to be executed by the service processor 3a and data. Examples of the memory 3b include one or both of a volatile memory such as a Dynamic Random Access Memory (DRAM) and a non-volatile memory such as Persistent Memory (PM).

The storage device 3c is an example of a HW device that stores various types of data and information such as a program. Examples of the storage device 3c includes a magnetic disk device such as a Hard Disk Drive (HDD), a semiconductor drive device such as a Solid State Drive (SSD), and various storing devices such as a nonvolatile memory. Examples of the nonvolatile memory include a flash memory, a Storage Class Memory (SCM), and a Read Only Memory (ROM).

The storage device 3c may also store a program (power control program: not illustrated) that achieves all or some of the various functions of the service processor 3a. For example, the service processor 3a can achieve the function of a power control unit 30 illustrated in FIG. 3 by expanding the program stored in the storage device 3c onto the memory 3b and executing the expanded program.

The fan 4 is an example of a cooling mechanism or a cooling unit that cools the processor 2. For example, each fan 4 may cool the processor 2 at a fan rotation speed corresponding to an input voltage controlled by the service processor 3a. In addition to the fans 4, the server 1 may include a fan that cools the internal space and other components of the server 1.

Multiple components (modules) in server 1, including the processors 2, the controller 3, and the fans 4, may be communicably coupled to each other via a bus.

A PSU 6 is an example of a power supply device or power supply unit. Each PSU 6 may carry out AC/DC conversion and conversion to a voltage suitable for each component on the power supplied from the distribution board 8 through the UPS 7 (or directly from distribution board 8), and supply each component with the converted power through the power supply path (see bold line in FIG. 1). For example, the PSU 6 may provide power after undergoing the voltage conversion to each component via a mounting board (e.g., a system board) of the component.

A UPS 7 is a power storage device that accumulates power and is an example of a power supply (battery). For example, the UPS 7 accumulates the power supplied by the power source and supplies power to the PSU 6 being connected thereto. In cases where the power supply from the power source stops, the UPS 7 supplies power accumulated therein to the PSU 6.

As illustrated in FIG. 2, a power supply group including the UPSs 70 supplied with power by the series-0 power source and the PSUs 60 is referred to as a series-0 power unit 50. Also, a power supply group including the UPSs 71 supplied with power by the series-1 power source and the multiple PSUs 61 is referred to as a series-1 power unit 51.

The server 1, for example the controller 3, may be configured to be communicable with each UPS 7 via a network 9, such as a Local Area Network (LAN).

Figure 3:
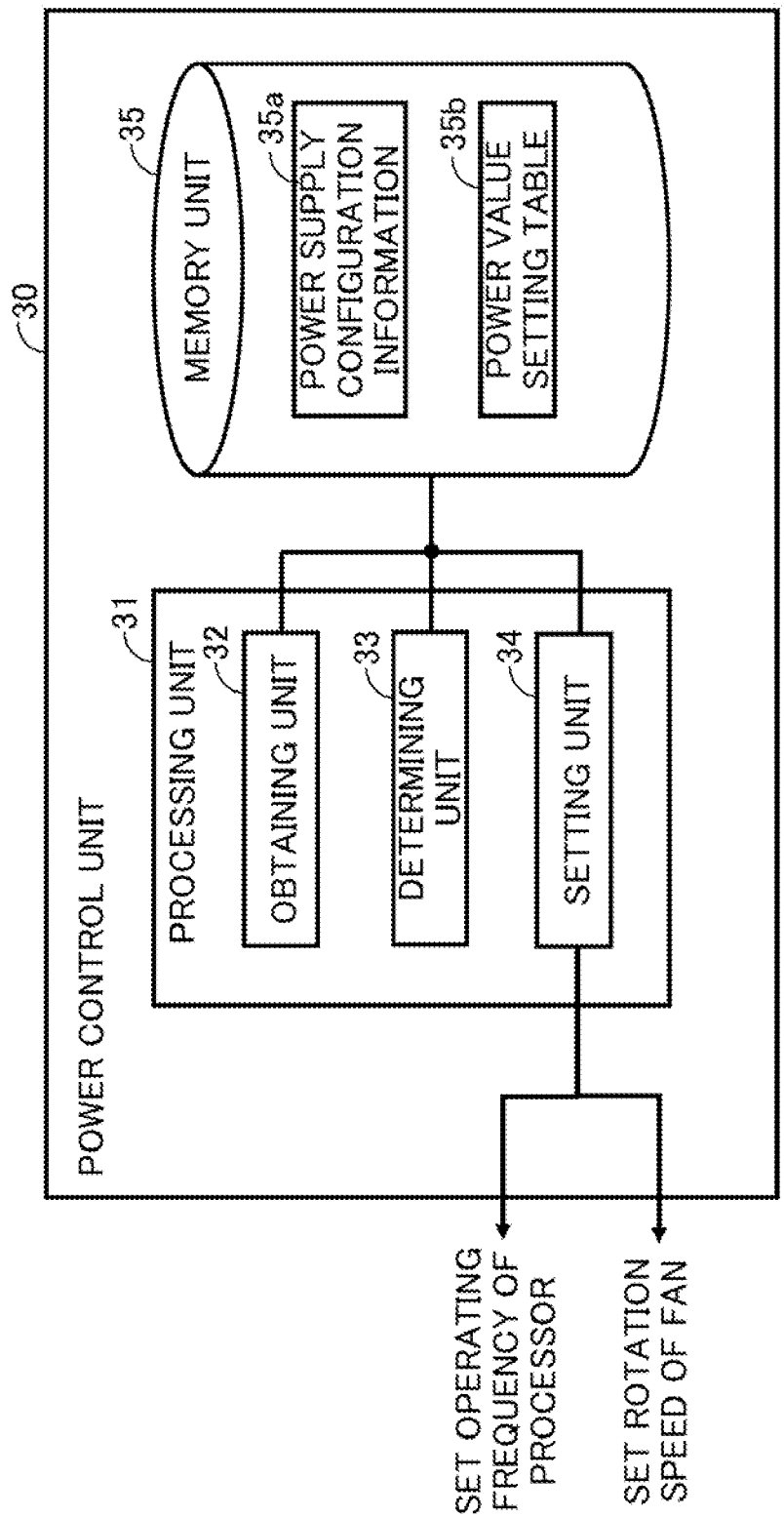
FIG. 3 is a block diagram schematically illustrating an example of a functional configuration of a controller according to one embodiment.

[1-2-2] Example of Functional Configuration of Controller:

Next, description will now be made in relation to an example of the functional configuration of the above-described controller 3. FIG. 3 is a block diagram schematically illustrating an example of the functional configuration of the power control unit 3 according to one embodiment. For example, the controller 3 may achieve the function of the power control unit 30 by the service processor 3a expanding a program stored in the storage device 3c onto the memory 3b and executing the expanded program.

As illustrated in FIG. 3, focusing on the function related to power control, the power control unit 30 may illustratively include a processing unit 31 and a memory unit 35.

The memory unit 35 is an example of a storage area or a storing device, and stores various information pieces related to power control. In one embodiment, the memory unit 35 may be implemented by a storage area that at least one of the memory 3b and the storage device 3c illustrated in FIG. 2 has. The memory unit 35 may store power supply configuration information 35a and a power value setting table 35b.

The processing unit 31 may illustratively include an obtaining unit 32, a determining unit 33, and a setting unit 34.

The obtaining unit 32 obtains the power supply configuration information 35a by, for example, collecting and stores the obtained power supply configuration information 35a into the memory unit 35. Furthermore, the obtaining unit 32 obtains the power value setting table 35b by, for example, reading from the storage device 3c (see FIG. 2), and stores the obtained power value setting table 35b into the memory unit 35.

The determining unit 33 makes determination based on the information stored in the memory unit 35 to control the operating frequencies of the processors 2 and the rotation speeds of the fans 4, and outputs the determination result to the setting unit 34.

The setting unit 34 sets the operating frequencies of the processors 2 and the rotational speeds of the fans 4 on the basis of the determination result obtained from the determination unit 33 (see "SET OPERATING FREQUENCY OF PROCESSOR" and "SET ROTATION SPEED OF FAN" in FIG. 3).

The processing unit 31 described above is an example of a control unit. Among the elements in the processing unit 31, the determining unit 33 and setting unit 34, for example, may set the operating frequency of each processor 2 connected to the multiple PSUs 6 each of which receives power from one or more power sources of one or more power source systems to a value corresponding to a power value determined on the basis of the following information. The information may include information about the number of systems in the multiple PSUs 6 and information about the number of UPSs 7 connected to the multiple PSUs 6.

By way of example, in cases where the number of systems is two or more and one or more PSUs 6 of each system are each connected to one or more UPSs 7, the setting unit 34 may control the operating frequency of each processor 2 to an operating frequency corresponding to a power value determined based on the number of PSUs 6 normally operating in a first system and the number of UPSs 7 in the second system, which differs from the first system.

For example, the following description assumes that the two systems are both normal (no power failure occurs) in the two-system power reception of FIG. 2. In this case, the setting unit 34 may control the operating frequency based on the sum of the power value corresponding to the number of PSUs 6 normally operating in the first system and the power value corresponding to the number of UPSs 7 in the second system.

The first and second systems may be determined in the following manner. For example, between the power value corresponding to the number of PSUs 6 in the 0-series system and also to the number of the UPSs 7 in the 1-series system and the power value corresponding to the number of PSUs 6 in the 1-series system and also to the number of the UPSs 7 in the 0-series system, the system having the PSUs 6 consisting of the smaller power value may be regarded as the first system and the system having the UPSs 7 consisting of the smaller power value may be regarded as the second system. In this case, the setting unit 34 may control the operating frequency of the processor 2 on the basis of (corresponding to) the smaller one of the power value suppliable by (based on) the number of PSUs 6 in the 0-series system and also suppliable by (based on) the number of the UPSs 7 in the 1-series system and the power value suppliable by the number of PSUs 6 in the 1-series system and also suppliable by the number of the UPSs 7 in the 0-series system.

As illustrated in FIG. 2, in cases where the number of PSUs 6 normally operating is n and the number of UPSs 7 is m in both the series-0 and series-1 systems, the first and second systems may not be distinguished from each other. In this case, the setting unit 34 may control the operating frequency of each processor 2 based on (corresponding to) the sum of the power value suppliable by (based on) the number n of PSUs 6 normally operating in each system and a power value suppliable by (based on) the number m of UPSs 7 in each system.

Figure 4:
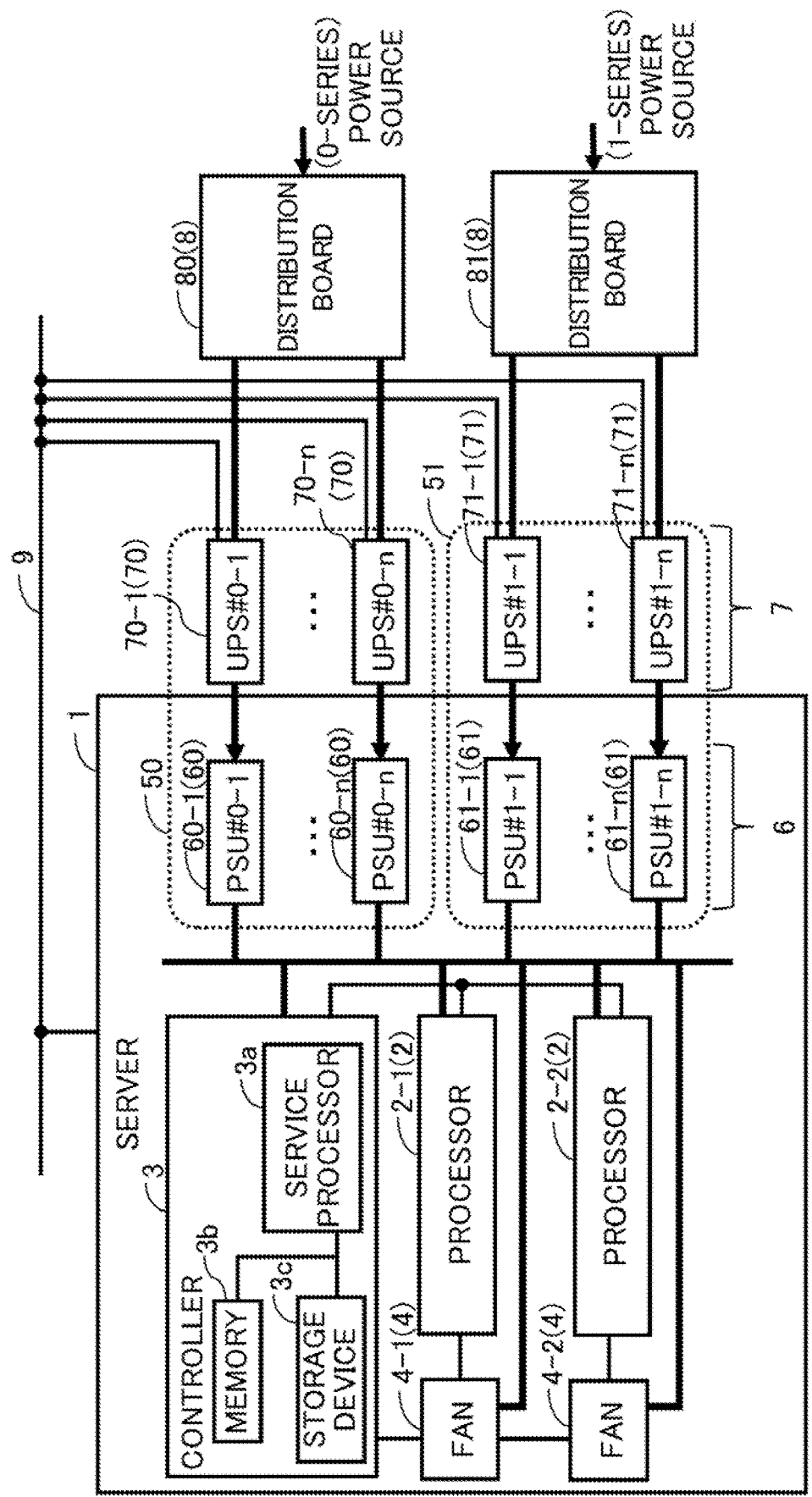
FIG. 4 is a diagram showing another example of a hardware configuration of the server according to one embodiment.

Incidentally, as illustrated in FIG. 4, the number of UPSs 7 in each of the series-0 and series-1 systems may be the same as the number of PSUs 6 in the system. In this case, m can be replaced with n, i.e., m=n. For example, the setting unit 34 may control the operating frequency of each processor 2 on the basis of the sum of the power value suppliable by the number n of PSUs 6 and the power value suppliable by the number n of UPSs 7, which means the number 2n corresponding to the twice the number of PSUs 6.

For simplicity, the following description assumes that the number of PSUs 6 normally operating is n and the number of UPSs 7 is m in both the series-0 and series-1 systems.

Thus, in cases where the two systems are both normal in the two-system power reception, each processor 2 can be operated at an operating frequency higher by an operating frequency corresponding to the power supplied from the UPSs 7 in the second system than an operating frequency corresponding to the power from the PSUs 6 normally operating in the first system.

Next, the following description assumes that a power failure occurs in one of the two systems in the two-system power reception of FIG. 2. In this case, the setting unit 34 may control the operating frequency based on a power value suppliable by the number of PSUs 6 normally operating in the first system.

Here, in cases where a power failure occurs in one system in the two-system power reception of FIG. 2, the m UPSs 7 in the other system can supply the server with power as much as m PSUs 6 within a predetermined time (e.g., 10 minutes) after the occurrence of the power failure. This means that the server 1 is supplied with a power as much as (n+m) PSUs 6 from the n PSUs 6 of the normal system and the UPSs 7 of the other system in which the power failure occurs within a predetermined time from the occurrence of the power failure in the one system.

Further, the power consumption of the server 1 is controlled such that the server is able to operate with the supplied power of (n+m) PSUs 6 prior to the occurrence of the power failure, as described above. Accordingly, the setting unit 34 satisfactorily controls the operating frequency of the processor 2 based on a power value suppliable by the n PSUs 6 normally operating in the first system within the predetermined time. As the above, in cases where a power failure occurs in one system in the two-system power reception, the server 1 may gradually (e.g., stepwise) control the operating frequency of each processor from the operating frequency controlled prior to the occurrence of the power failure to the operating frequency based on the power value supplied by the PSUs 6 operating in the normal system.

As described above, the server 1 according to one embodiment can enhance the throughput of the processor 2 while utilizing the redundant configuration of the power units 50 and 51 in the two-system power reception.

Further, in cases where an abnormality of the system, for example, a power failure, occurs in the server 1 having a configuration of a one-system power reception, it is difficult to continuously operate the server 1. Therefore, only abnormalities of PSUs 6 among system failures and the PSU 6 failures should be considered for the one-system power reception. Therefore, the setting unit 34 controls, for example, the operating frequency of each processor based on a power value suppliable by the PSUs 6 as many as the value obtained by subtracting one from the number of PSUs 6 normally operating in the one-system power reception. This makes it possible to maximize the throughput of the processor 2 to the extent that the operation of the server 1 can be continued even if a failure occurs in one PSU 6 in such one-system power reception.

[1-3] Description of Power Control Unit

Hereinafter, description will now be made in relation to an example of the process by the power control unit 30.

(Description of Obtaining Unit 32)

The obtaining unit 32 obtains the power supply configuration information 35*a* through one of or both the power supply path and the network 9. The power supply configuration information 35*a* may include information about the number of power reception systems and information about the number of UPSs 7.

The information about the number of power reception systems may be obtained by, for example, transmitting and receiving a high-frequency signal (test signal) for testing between the PSUs 6 each not being connected with the UPSs 7. For example, the service processor 3a that executes the obtaining unit 32 may transmit a high-frequency signal from a transmitting circuit between the PSUs 60 each not being connected with the UPSs 7 and determine whether or not the high-frequency signal is received by a receiving circuit. This can determine whether the PSU 60 of the transmitting side of the high-frequency signal is in the same system of the PSU 60 on the receiving side of the signal, in other words, determine the number of systems. Incidentally, the transmitting circuit and the receiving circuit may be provided on the PSU 60 of the transmitting side and the PSU 60 of the receiving side, respectively.

In one embodiment, the high frequency signal may be transmitted through a power supply path (power line). Further, in place of a simple configuration using a transmitting circuit and a receiving circuit, for example, the number of systems may be obtained by communication of a test signal or a control signal through power line communication (PLC) or by communication via a network such as LAN.

Figure 5:
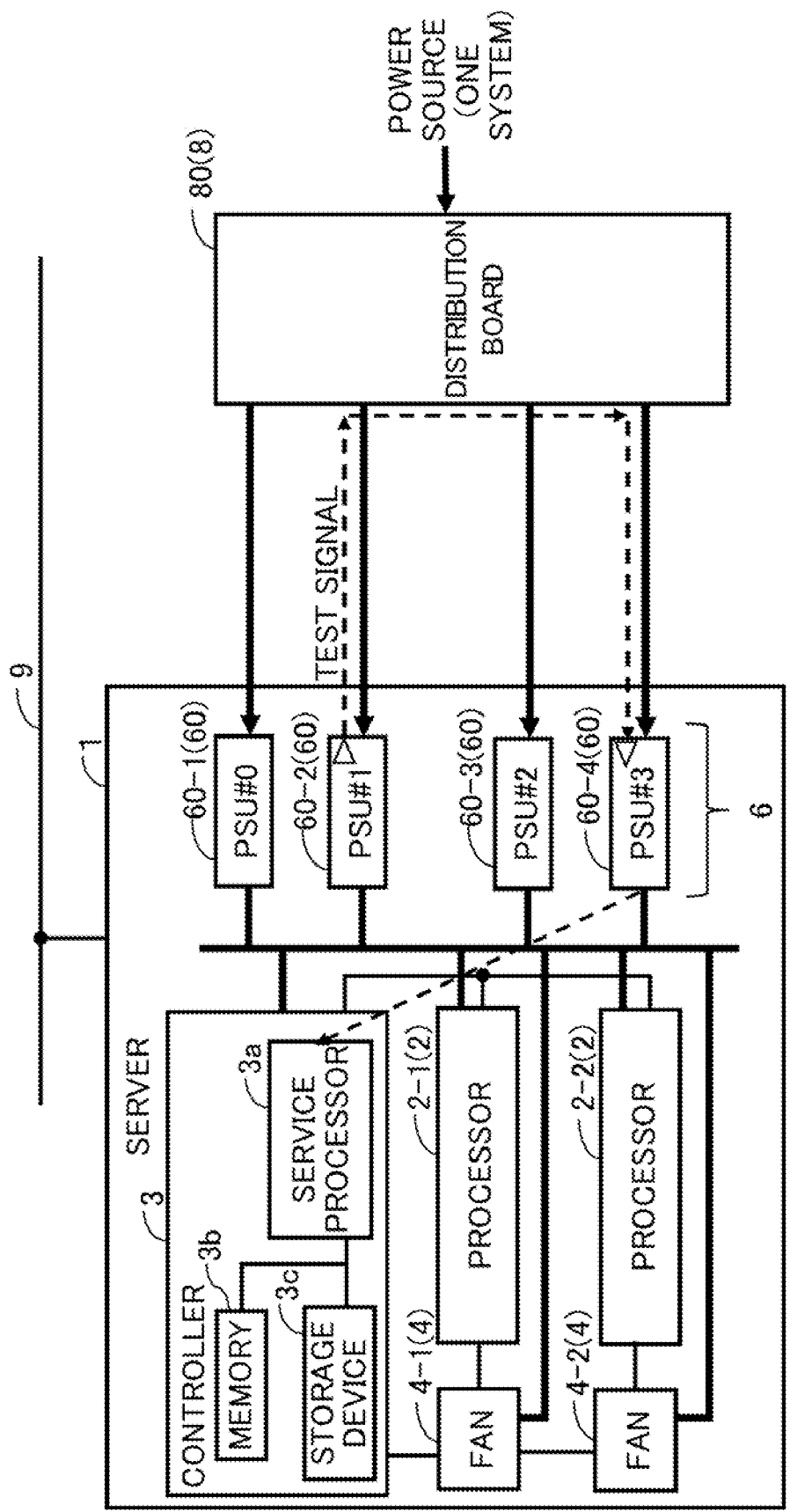
FIG. 5 is a diagram illustrating an example of a process of obtaining power supply configuration information according to one embodiment.

FIG. 5 is a diagram illustrating an example of a process of obtaining the power supply configuration information 35a under a state of the number of power reception systems when the server 1 receives power from a single power source system. In the example of FIG. 5, each of the PSUs 60-1 to 60-4 may be connected to one power source via a distribution board 80 in the sever 1.

As illustrated in FIG. 5, the obtaining unit 32 implemented by the service processor 3a transmits a test signal from the PSU 60-2 to the PSU 60-4 through the power supply path. The test signal is received by the PSU 60-4 via distribution board 80 (see dashed line in FIG. 5). The PSU 60-4 transmits whether or not the test signal is successfully received to obtaining unit 32. The communication between the service processor 3a and the PSUs 60 may be performed via a network, a control line, or a power supply path. The same is applied to the description of following FIGS. 6 and 7.

Although the example of FIG. 5 assumes that a test signal is transmitted from the PSU 60-2 to the PSU 60-4, the service processor 3a may, for example, transmit a test signal for each combination of the PSUs 60 each not being connected with the UPS 7. Alternatively, the service processor 3a may broadcast a test signal from any PSU 60 not being connected with the UPS 7. The same is applied to the description of following FIGS. 6 and 7 below.

Figure 6:
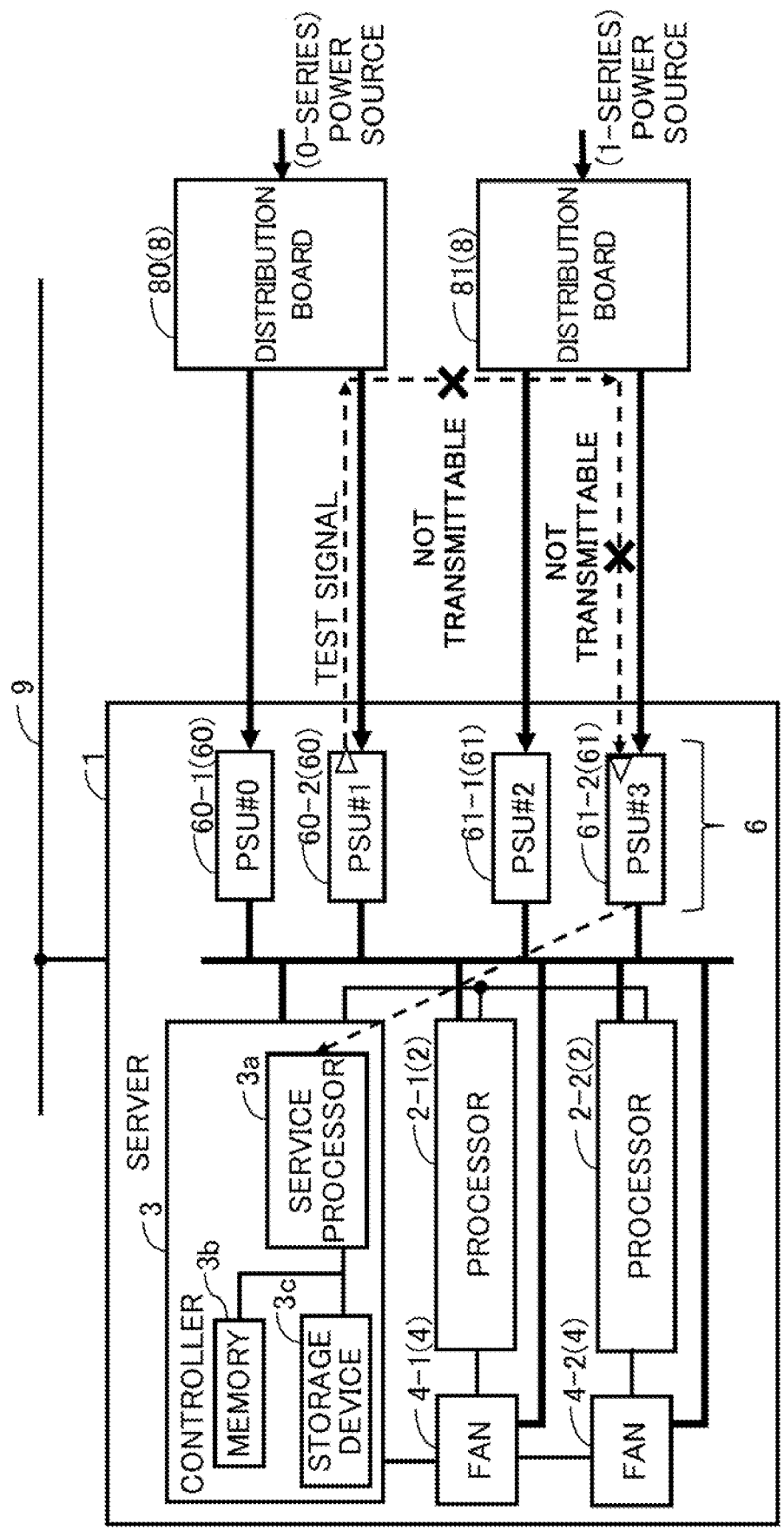
FIG. 6 is a diagram illustrating another example of a process of obtaining the power supply configuration information according to one embodiment.

FIG. 6 is a diagram illustrating an example of a process of obtaining the power supply configuration information 35a in the number of power reception systems when the server 1 receives power from two power source systems. In the example of FIG. 6, in the server 1, the PSUs 60-1 and 60-2 may be connected via the distribution board 80 to the series-0 power source and the PSUs 61-1 and 61-2 may be connected via the distribution board 81 to the series-1 power source. In the example of FIG. 6, the PSUs 6 are each not connected with a UPS 7.

As illustrated in FIG. 6, the obtaining unit 32 implemented by the service processor 3a transmits a test signal from the PSU 60-2 to the PSU 61-2 through the power supply path. Since the PSU 60-2 and the PSU 61-2 are connected to different distribution boards 8, the test signal is not received by the PSU 61-2 (see dashed line in FIG. 6). The PSU 61-2 transmits the receivability representing whether or not the test signal is successfully received to obtaining unit 32.

Figure 7:
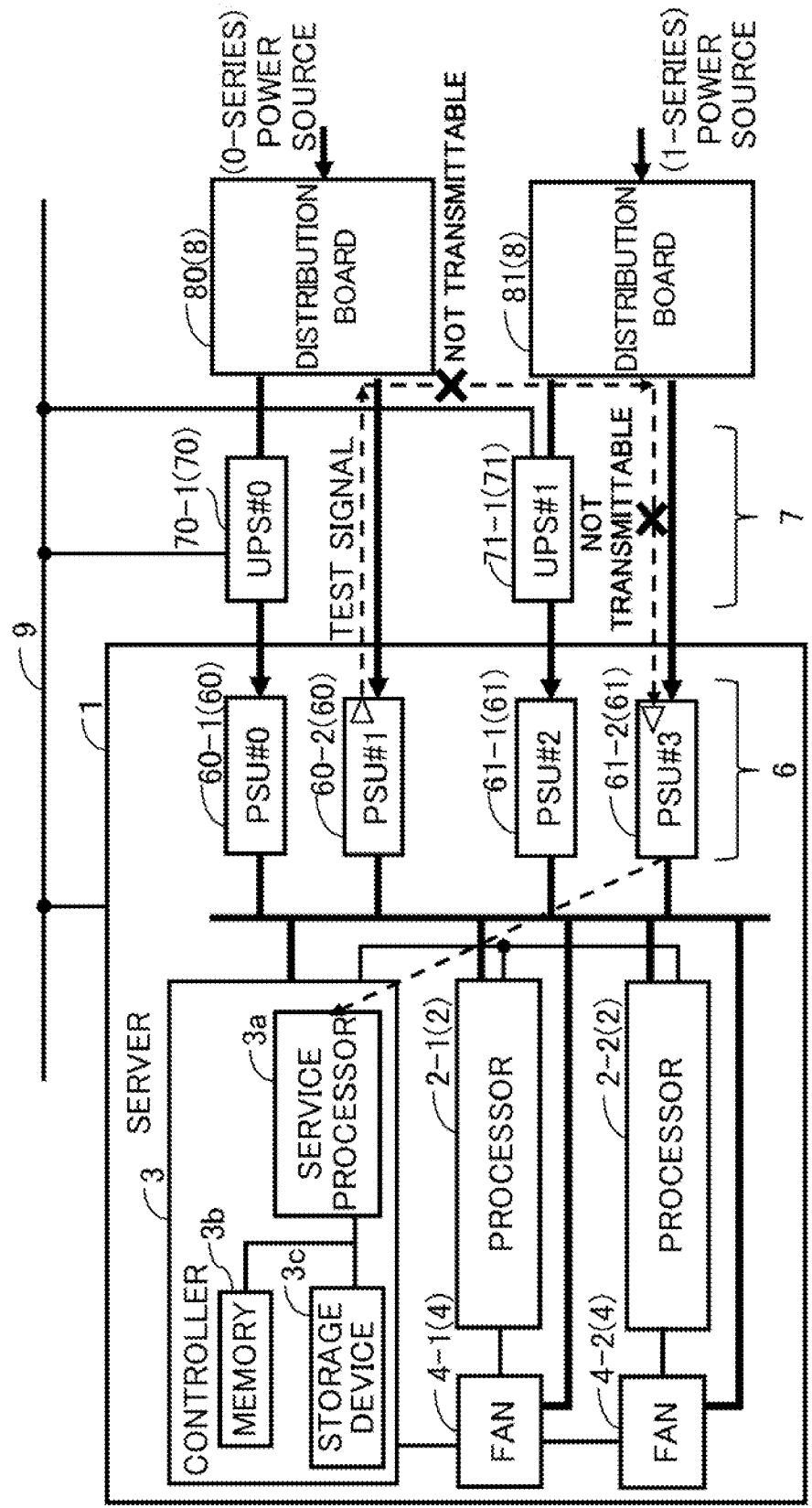
FIG. 7 is a diagram illustrating still another example of a process of obtaining the power supply configuration information according to one embodiment.

FIG. 7 is a diagram illustrating an example of a process of obtaining the power supply configuration information 35a under a state of the number of power reception systems when the server 1 receives power from two power source systems. In the example of FIG. 7, in the server 1, the PSUs 60-1 and 60-2 may be connected via the distribution board 80 to the series-0 power source and the PSUs 61-1 and 61-2 may be connected via the distribution board 81 to the series-1 power source. The UPS 70-1 may be connected between the PSU 60-1 and the distribution board 80, and the UPS 71-1 may be connected between the PSU 61-1 and the distribution board 81.

As illustrated in FIG. 7, the obtaining unit 32 implemented by the service processor 3a transmits a test signal from the PSU 60-2 to the PSU 61-2 through the power supply path. Since the PSU 60-2 and the PSUS 61-2 are connected to different distribution boards 8, the test signal is not received by the PSU 61-2 (see dashed line in FIG. 7). The PSU 61-2 transmits the receivability to obtaining unit 32.

The obtaining unit 32 sets the information related to the number of power reception systems in the power supply configuration information 35a on the basis of the receivability obtained by the manner exemplified in FIGS. 5 to 7. For example, in cases where the receivability indicates "receivable", the obtaining unit 32 may set the number of power reception systems being one in the power supply configuration information 35a. Further, in cases where the receivability indicates "unreceivable", the obtaining unit 32 may set the number of power reception systems being two in the power supply configuration information 35a. For example, obtaining unit 32 may determine that the number of power reception systems is one (one-system power reception) in the example of FIG. 5, and determine that the number of power reception systems is two (two-system power reception) in the examples of FIG. 6 and FIG. 7.

In addition, in cases where the number of power reception systems are determined to be three or more on the basis of the combinations of the PSUs 60 each for which receivability is obtained, the obtaining unit 32 may set the number of power reception systems being three or more and the relationship of the PSUs 60 and each system in the power supply configuration information 35a.

The information about the number of UPSs 7 may be obtained, for example, by the service processor 3a monitoring each UPS 7 via a network 9 such as a LAN. Any known method of monitoring the presence or absence of a UPS 7 and the state of the UPS 7 may be applied to the manner of obtaining the information. For example, the obtaining unit 32 may set the absence of an UPS 7 in any system of the examples of FIGS. 5 and 6 in the power supply configuration Information 35a. Further, the obtaining unit 32 may set the presence of a single UPS 7 in each system of the example of FIG. 7 in the power supply configuration information 35a.

The obtaining unit 32 stores the power supply configuration information 35a obtained (generated) in the above-described method into the memory unit 35.

In addition, the obtaining unit 32 reads the power value setting table 35b from the storage device 3c, and stores the obtained power value setting table 35b into the memory unit 35.

The power value setting table 35b is an example of power value setting information that associates the number of power source systems, the number of UPSs 7, and the operating frequency to be set in the processor 2 with one another. The power value setting table 35b may be generated in advance according to the manner of power reception of the servers 1 and stored in the storage device 3c.

FIG. 8 is a diagram illustrating an example of the power value setting table 35b. The power value setting table 35b associates, for example, a power reception system number (the number of power reception systems), configuration information of the server 1, and consumption power of the sever 1 with one another.

As illustrated in FIG. 8, the power value setting table 35b may include the fields of "two-system power reception" and "one-system power reception" as the number of power receiving systems, and the field of "two-system power reception" may include the fields of "presence of UPS" and "absence of UPS."

The power value setting table 35b may include fields of "processor operating frequency (GHz)", "fan rotation speed (rpm)", "consumption power of remaining components (kW)", and "total consumption power (kW)" depending on "operable PSU number" and "UPS number of the system". In the fields of the "operable PSU number", the items of "normal power supply" by an operable PSU 6, and "power supply within ten minutes from the occurrence of power failure (kW)" and "power supply after ten minutes from the occurrence of power failure (kW)" under a state of "presence of UPS" may be set. The field of the "consumption power (kW)" may be set for the fields of "processor operating frequency" and "fan rotation speed". In addition, under a state of "presence of UPS", corresponding values when "normal" and "when power failure" may be set in each of the "processor operating frequency", the "fan rotation speed", the "consumption power of remaining components" and the "total consumption power".

Incidentally, in the description of FIG. 8 below, as a premise, it is assumed that each PSU 6 can supply power of 1 kW, and the UPS 7 supplies power suppliable by a single PSU 6 at the time of power failure, which means a single UPS supplies power of 1 kW.

In the embodiment of FIG. 8, in the field of the "processor operating frequency", a value corresponding to the power value based on the power reception system number and the number of the UPSs 7 may be set. Similarly, in the fields of the "fan rotation speed" and "consumption power of remaining components", respective values corresponding to the power value based on the power reception system number and the number of UPSs 7 may be set. The sum of "processor operating frequency", "fan rotation speed" and "consumption power of remaining components" may be set in "total consumption power". In other words, regarding the power (or the power equal to or less than this) based on the power reception system number and the number of UPSs 7 as the "total consumption power", the "total power consumption" is distributed to the "processor operating frequency", the "fan rotation speed" and the "consumption power of remaining components".

As an example, in cases where an abnormality exemplified by power failure occurs under a state of the "one-system power reception", it is difficult to continue the operation the server 1. Accordingly, among the abnormality in the system and a failure of the PSU 6, only the failure of the PSU 6 is satisfactorily considered in the "one-system power reception". Therefore, in the "one-system power reception", the "total consumption power" may be set to, for example, a value equal to or less than "k−1 (k is the number of normal PSUs 6, where k≤2n)"×"P [W]". Incidentally, the term P [W] is a supplied power value per one PSU 6. In the example of FIG. 8, the fields of the "one-system power reception" may include the values of two, three, and four as the operable PSU 6 number.

For example, when the "operable PSU number" is "4", the maximum power that the PSU 6 can supply is [4.0 kW] (see "normal power supply"). In this case, the power ("total consumption power") supplied to the components in the server 1 may be set to the power value [3.0 kW], which is supplied by the three (i.e., four minus one) PSUs 6, in case of failure of one of the PSUs 6. The power value supplied by the three PSUs 6 is distributed to the processors 2, the fans 4, and the other components.

Incidentally, since the operating frequency of the processor 2 and the rotation speed of the fan 4 are correlated with the consumption power, the operating frequency or the rotation speed corresponding to the consumption power or the consumption power corresponding to the operating frequency or the rotation speed can be obtained. For example, when the operating frequency of the processor 2 is [3 GHz], the consumption power is [1.5 kW].

As other example, in cases where an abnormality exemplified by a power failure occurs in one of the systems under a state of "two-system power reception and the absence of UPS", the server 1 is supplied with power from only the other system (a single system) of the two systems. Therefore, in the "two-system power reception and the absence of UPS", the "total consumption power" is satisfactorily be set to, for example, a value equal to or less than "the number of normal PSUs 6 (≤n)"×"P [W]".

In the embodiment of FIG. 8, since the "number of operable PSUs" under a state of "two-system power reception and the absence of UPS" is (2+2), the power ("total consumption power") supplied to the components ("total consumption power") in the server 1 may be set to the power value [2.0 kW] supplied by the two PSU 6 in a single system. The power provided by the two PSUs 6 is distributed to the processors 2, the fans 4, and the other components.

As other example, in cases where an abnormality exemplified by a power failure occurs in one of the systems under a state of "two-system power reception and the presence of UPS", the server 1 is supplied with the power from the UPSs 7 from the failed system in addition to from the PSUs 6 of the other system in a predetermined time after the occurrence of the power failure. Therefore, in the "two-system power reception and the presence of UPS", if the m UPSs 7 (1≤m≤n−1) are connected to each system, the "total consumption power" is satisfactorily set to be equal to or less than the sum (n+m) of the power suppliable by the number n of PSUs 6 of each system and the power suppliable by the number m of UPSs 7.

In the case of FIG. 8, since the "operable PSU number" is four in total, the maximum power that can be supplied by the all the PSUs 6 is (4.0 kW) (see "normal power supply"). In this case, the power ("total consumption power") supplied to the components in the server 1 when a normal state or in ten minutes after the occurrence of power failure may be set to the power value [3.0 kW] corresponding to the sum of two PSUs 2 in each system and one UPS in each system. The power provided by the three PSUs 6 is distributed to the processors 2, the fans 4, and the other components.

In addition, it is sufficient to set the "total power consumption" to be equal to or less than "the normal number of PSU 6 (≤n)"×"P [W]" after 10 minutes from the occurrence of a power failure in the "two-system power reception and the presence of UPS". In the example of FIG. 8, the power ("total consumption power") supplied to the components in the server 1 may be set to the power value [2.0 kW] suppliable by the two PSUs of the each system.

From the above, even when one of the power systems undergo a power failure, power that is greater in amount than that suppliable by the number of PSUs 6 of the respective systems can be used within the server 1 while maintaining a redundant configuration of the two-system power reception within a predetermined period of time from the occurrence of a power failure. The period during which a UPS 6 can supply power to the server 1 after the occurrence of the power failure is a grace period for performing control to reduce the consumption power in the server 1 to the equivalent of one-system power reception. Therefore, when a power failure occurs, the power consumption of the server 1 is reduced stepwise, thereby suppressing a sudden drop of the throughput of the processors 2.

From the above, in the two-system power reception, it is possible to supply the power of more than the power suppliable by the PSU 6 number included in each system to the server 1 in the normal state and within a predetermined time after the occurrence of the power failure.

By holding the power value setting table 35*b* in advance, the server 1 is allowed to easily and rapidly control the operating frequency and the rotation speed depending on the configurations of the system and the power supply.

Incidentally, the power value setting table 35*b* may omit the items surrounded by [ ] in the example of FIG. 8.

(Description of Determining Unit 33 and Setting Unit 34)

The determining unit 33 may determine the power reception system of the server 1, and the presence or absence of a UPS 7 connected to each system with reference to the power supply configuration information 35*a*, and output the determination result to the setting unit 34.

For example, the determining unit 33 refers to the power supply configuration information 35*a* and *s* determines whether or not the power reception configuration of the server 1 is in the state of the one-system power reception. In cases where the power reception configuration is not in the state of the one-system power reception, the determining unit 33 determines whether or not one or more UPS 7 are connected to each PSU 6 of each system. Further, when the power reception state of the server 1 is the one-system power reception, the determining unit 33 determines whether or not the one-system power reception state is caused by power failure of one-system in the two-system power reception and determines the number of PSUs 6 normally operating. The determination unit 33 transmits the determination result to the setting unit 34.

In cases where the number of PSUs 6 normally operating is determined to be one, the determining unit 33 may output a message prompting maintenance so that two or more PSUs 6 come to operate normally. The message may be output visually or audibly by an output device (not illustrated) provided in the server 1, may be stored in the memory unit 35, or may be transmitted to a terminal or the like.

Further, in cases where a failure of the PSUs 6 is detected after the number of PSUs 6 normally operating is determined to be two or more, the determining unit 33 again determines whether or not the server 1 is in the state of the one-system power reception on the basis of the power supply configuration information 35*a* and determines whether or not the number of PSUs 6 normally operating is two or more.

The setting unit 34 sets, based on the determination result obtained from the determining unit 33, the "processor operating frequency" and the "fan rotation speed" in the processor 2 and the fan 4, respectively, with reference to the power value setting table 35*b* stored in the memory unit 35.

[1-4] Example of Operation

Figure 9:
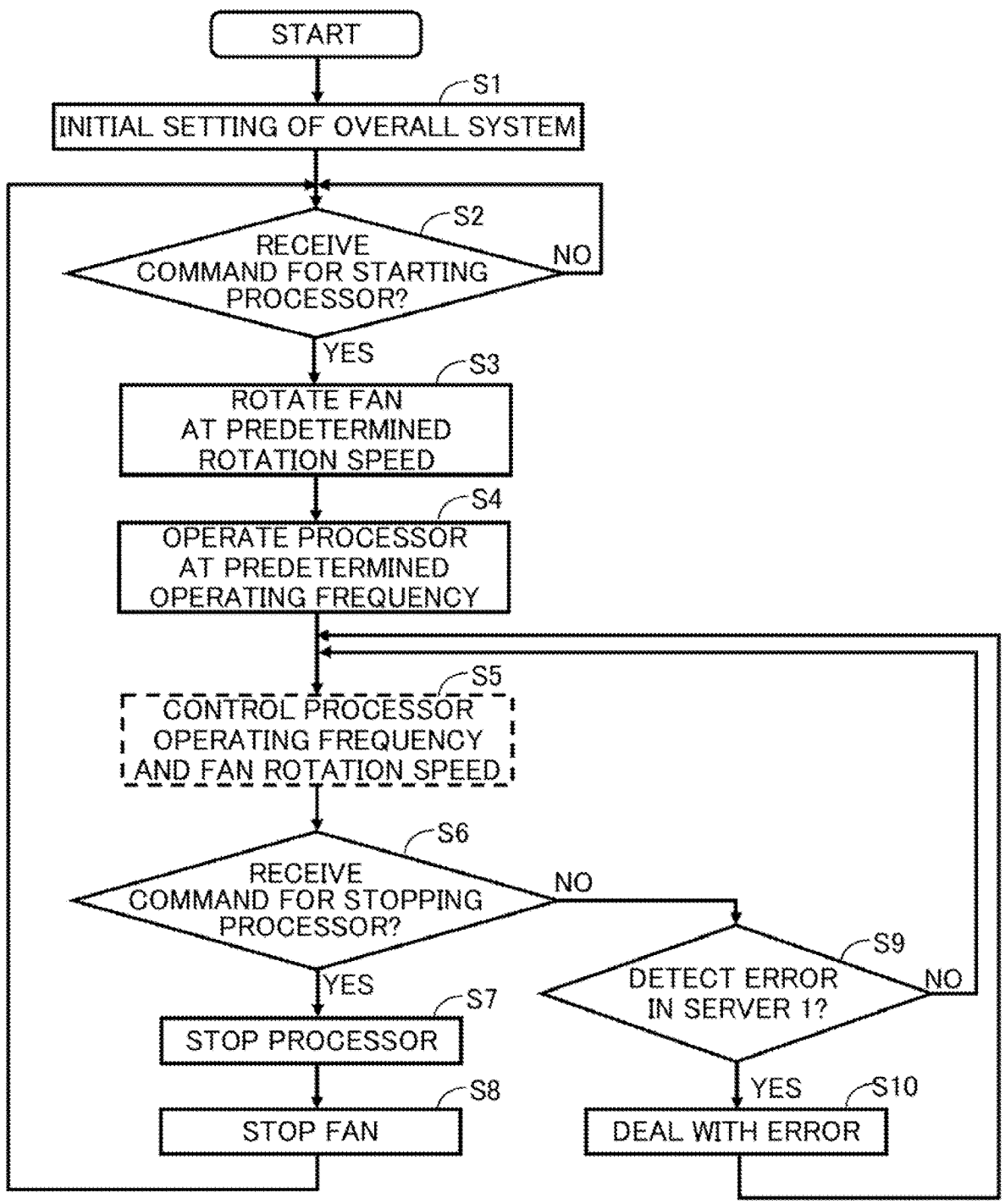
FIG. 9 is a flowchart illustrating an example of an operation of a server according to one embodiment.
Figure 10:
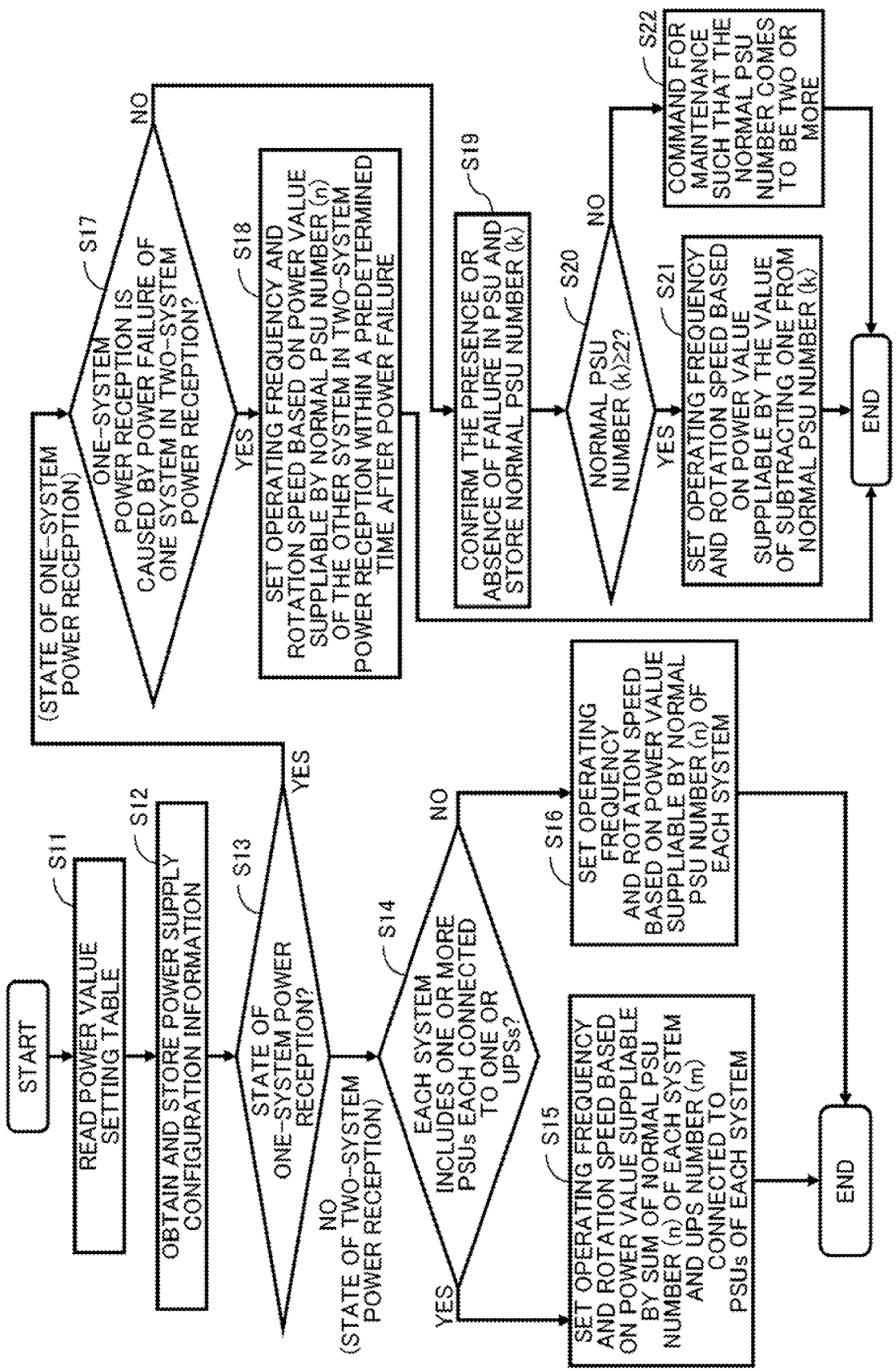
FIG. 10 is a flowchart illustrating an example of operation example of the power control unit according to one embodiment.

Next, description will now be made in relation to an example of operation of power control according to the one embodiment having the above configuration with reference to FIGS. 9 and 10. FIG. 9 is a flowchart illustrating an example of the operation of the server 1, and FIG. 10 is a flowchart illustrating an example of the operation of the power control unit 30.

[1-4-1] Example of Operation of the Server:

As illustrated in FIG. 9, the controller 3 makes the initial setting of the overall system in the server 1 including the processors 2 (Step S1).

The controller 3 waits for receiving a command for starting the processors 2 (e.g., reception of a command or input from a panel) (Step S2, NO in Step S2).

Upon receipt of the command for starting (YES in Step S2), the controller 3 rotates each fan 4 at a predetermined rotation speed (Step S3). The controller 3 also operates each processor 2 at a predetermined operating frequency (Step S4).

The controller 3 controls the operating frequency of the processor 2 and the rotation speed of the fan 4 (Step S5). Details of the process performed in Step S5 will be described below with reference to FIG. 10.

The controller 3 monitors the presence of a command for stopping the processor 2 from the operator (e.g., reception of a command or input from a panel) (Step S6).

Upon receipt of a command for stopping (YES in Step S6), the controller 3 stops the operation of the processor 2 (Step S7), stops the rotation of the fan 4 (Step S8), and the process proceeds to Step S2.

On the other hand, in cases where the controller 3 does not receive the command for stopping (NO in Step 6), the controller 3 determines whether or not an error has been detected in the server 1 including processor 2 (Step S9). If no error is detected (NO in Step S9), the process proceeds to Step S5.

If an error is detected (YES in Step S9), the controller 3 starts a process to deal with the error (Step S10), and the process proceeds to Step S5. The process to deal with the error may include at least one of the following (1) and (2).

(1) A process of supporting hot swapping of a component such as a failed PSU 6. Incidentally, the process of supporting hot swapping may include a step of outputting a message prompting the operator to carry out hot swapping and a step incorporating the replaced normal product into the system.

(2) A process to monitor power restoration in the event of occurrence of a power failure.

(1-4-2) Example of Operation of the Power Control Unit:

Next, description will now be made in relation to an example of an operation of the power control unit 30 in Step S5 of FIG. 9. As illustrated in FIG. 10, the obtaining unit 32 of the processing unit 31 reads the power value setting table 35*b* from the storage device 3*c* (Step S1*l*), and stores the read table 35*b* into the memory unit 35.

The obtaining unit 32 also collects power supply configuration information 35*a* about the power reception system number and the number of UPSs 7 connected to PSUs 6, and stores the collected power supply configuration information 35*a* into the memory unit 35 (Step S12). Incidentally, in the process of Step S12, as information about, for example, the PSUs 6, the UPSs 7, and the systems, information obtained in the processes of Steps S9 and S10 of FIG. 9, or information obtained by other process may be further stored in the memory unit 35.

Incidentally, the processes of Steps S11 and S12 may be omitted if Step S5 in FIG. 9 has already been executed after the start of the server 1. Further, even if Step S5 has already been executed, in cases where the power supply configuration is changed due to the occurrence of, for example, failure of a PSU 6 or a UPS 7 or a power failure of the system, the process of Step S12 may be executed.

The determining unit 33 determines whether or not the server 1 is in a state of the one-system power reception on the basis of the power supply configuration information 35a stored in the memory unit 35 (Step S13).

In cases where the server 1 is not in a state of the one-system power reception (NO in Step S13), the determining unit 33 determines whether each system includes one or more PSUs 6 each connected to one or more UPSs 7 (Step S14).

In cases where one or more PSUs 6 are each connected to one or more UPSs 7 (YES in Step S14), the setting unit 34 refers to the power value setting table 35b. Then, the setting unit 34 reads the operating frequency and the rotation speed based on the power value suppliable by the sum of the number of PSUs 6 normally operating in one system and the number of UPSs 7 of the other system from the power value setting table 35b, and sets the operating frequency and the rotation speed in the processor 2 and the fan 4, respectively.

For example, the following description assumes that the two systems both have the number n of PSUs 6 and the number m of UPSs 7. In this case, the setting unit 34 reads the operating frequency and the rotation speed based on the power value suppliable by the sum n+m of the number n of PSUs 6 normally operating (i.e., normal PSU number) in each system and the number m of UPSs 7 connected to the PUSs 6 in each system from the power value setting table 35b (see FIG. 8). Then, the setting unit 34 sets the read operating frequency and the rotation speed in the processor 2 and the fan 4, respectively (step S15), and the process of Step S5 of FIG. 9 is completed.

In cases where one or more PSUs 6 are not each connected to one or more UPSs 7 (NO in Step S14), the setting unit 34 reads the operating frequency and the rotation speed corresponding to the power value suppliable by the number of PSUs 6 operating normally in one of the systems from the power value setting table 35b. For example, in the example of FIG. 8, the setting unit 34 reads the operating frequency and the rotation speed based on the power value suppliable by the number n (=2) of PSUs 6 normally operating in one system. Then, the setting unit 34 sets the read operating frequency and the rotation speed to the processor 2 and the fan 4, respectively (Step S16), and the process of Step S5 of FIG. 9 is completed.

On the other hand, in Step S13, in cases where the server 1 is in a state of the one-system power reception (YES in Step S13), the determining unit 33 determines whether or not the one-system power reception is caused by a power failure occurring in one system of the two-system power reception (Step S17). The determination in Step S17 may be made on the basis of, for example, a change of the power supply configuration detected in Step S12 (e.g., difference between the power supply configuration information 35a obtained previously and the difference between power supply configuration information 35a obtained this time), or an error detected in Step S9 of FIG. 9.

In cases where the one-system power reception is caused by a power failure occurring in one system of the two-system power reception (YES in step S17), the setting unit 34 refers to the power value setting table 35b. Then, within a predetermined time immediately after the power failure, for example, in 10 minutes, the setting unit 34 reads the operating frequency and the rotation speed corresponding to the power value suppliable by the number n of PSU 6 normally operating in the other system, sets the read operating frequency and rotation speed in the processor 2 and the fan 4, respectively (Step S18), and the process of Step S5 of FIG. 9 is completed.

In cases where the one-system power reception is not caused by a power failure occurring in one system of the two-system power reception (NO in Step S17), the obtaining unit 32 refers to the information about the presence or absence of a failure in the PSUs 6 and stores the number of PSUs 6 normally operating into the memory unit 35 (Step S19). The information about the presence or absence of a failure in the PSUs 6 may be obtained at the time of obtaining the power supply configuration information 35a in Step S12.

The determination unit 33 determines, based on the information about the presence or absence of a failure in the PSUs 6, whether the number k of PSUs 6 normally operating is two or more (Step S20).

In cases where the number k of PSUs 6 normally operating is two or more (YES in step S20), the setting unit 34 refers to the power value setting table 35b. Then, the setting unit 34 reads the operating frequency and the rotation speed corresponding to the power value suppliable by the number obtained by subtracting one from the number k of PSUs 6, sets to the read operating frequency and the rotation speed in the processor 2 and the fan 4, respectively (Step S21), and the process of Step S5 of FIG. 9 is completed.

In cases where the number k of PSUs 6 normally operating is not two or more (NO in Step S20), the determining unit 33 outputs a message prompting maintenance so that the number of PSUs 6 normally operating comes to be two or more (Step S22), and the process of Step S5 of FIG. 9 is completed.

[1-5] Example of Hardware Configuration of Controller

Figure 11:
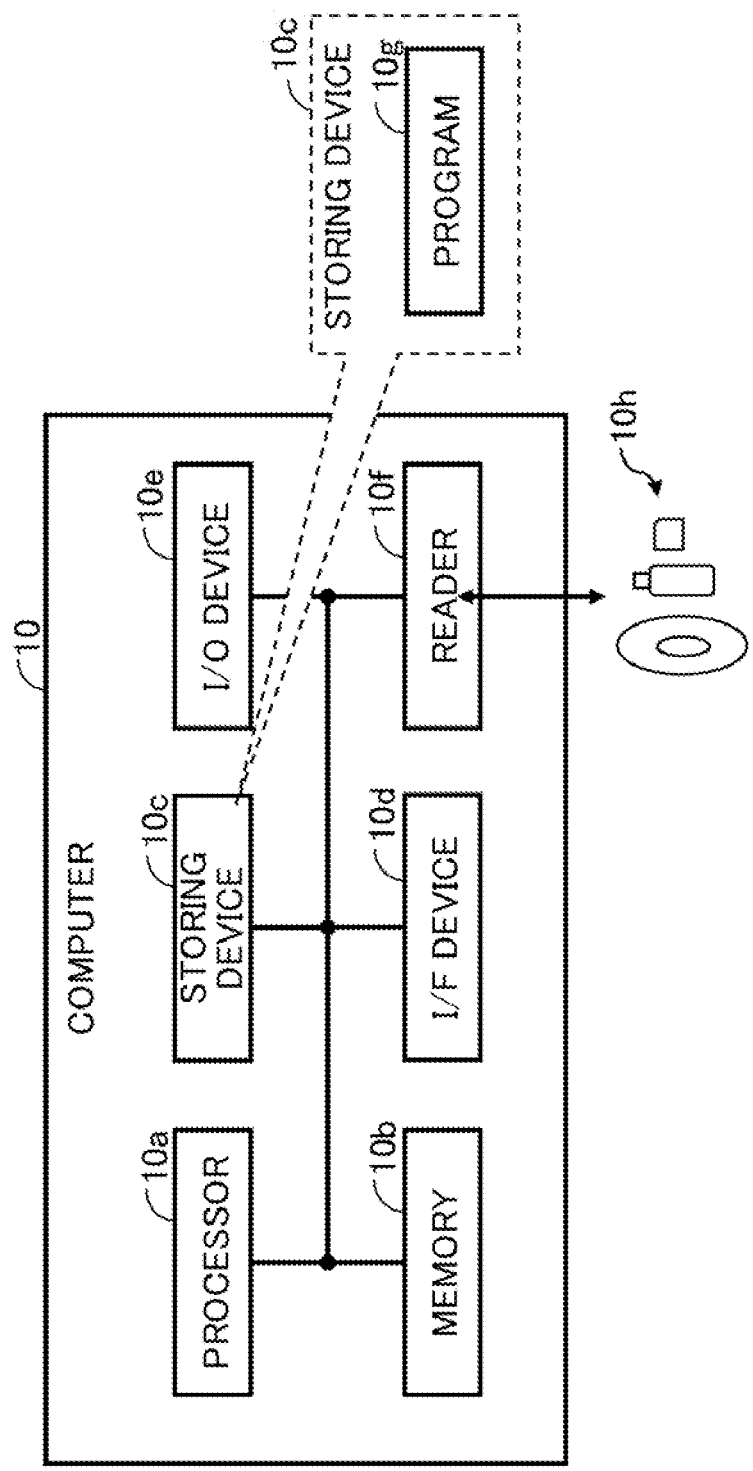
FIG. 11 is a block diagram illustrating an example of a hardware configuration of a computer.

FIG. 11 is a block diagram illustrating a HW configuration of a computer 10. Hereinafter, description will now be made in relation to the HW configuration provided by a computer 10 serving as an example of the controller 3.

As illustrated in FIG. 11, as a HW configuration, the computer 10 may illustratively include a processor 10a, a memory 10b, a storing device 10c, an interface (IF) device 10d, an Input/Output (IO) device 10e, and a reader 10f.

The processor 10a is an example of an arithmetic operation processor that performs various controls and arithmetic operations. The processor 10a may be communicably connected to the blocks in the computer 10 via a bus 101. The processor 10a is an example of the service processor 3a illustrated in FIG. 2. The processor 10a may be a multiprocessor or a multi-core processor having multiple cores.

The memory 10b is an example of a HW device that stores various types of data and information such as a program. The memory 10b is an example of the memory 3b shown in FIG. 2.

The storing device 10c is an example of a HW device that stores various types of data and information such as program. The storing device 10c is an example of the storage device 3c illustrated in FIG. 2.

The storing device 10c may also store a program log (power control program) that achieves all or some of the various functions of the computer 10a. For example, the processor 10a serving as the service processor 3a can achieve the function of the processing unit 31 of FIG. 3 by expanding the program 10 stored in the storing device 10c onto the memory 10b and executing the expanded program.

The IF device 10d is an example of a communication IF that controls connection and communication with a network. For example, the IF device 10d may include adapters conforming to Ethernet (registered trademark), InfiniBand, Myrinet, or optical communications such as FCs (Fibre Channel), and the like. The adapter may be compatible with one of or both wireless and wired communication schemes. For example, the server 1 may be communicably connected to the UPS 7 and a non-illustrated terminal device used by the operator or the system manager via the IF device 10d. The program log may be, for example, downloaded from the network to the computer 10 via the communication IF and stored in the storing device loc.

The IO device 10e may include one of or both an input device and an output device. Examples of the input device include a keyboard, a mouse, and a touch panel. Examples of the output device include a monitor, a projector, and a printer.

The reader 10f is an example of a reader that reads data and programs recorded in the recording medium 10h. The reader 10f may include a connecting terminal or a device to which the recording medium 10h can be connected or inserted. Examples of the reader 10f include an adapter conforming to, for example, Universal Serial Bus (USE), a drive apparatus that accesses a recording disk, and a card reader that accesses a flash memory such as an SD card. The program 10g may be stored in the recording medium 10h, and the reader 10f may read the program 10g from the recording medium 10h and store the read program 10g into the storing device 10c.

The recording medium 10h is example of a non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an S) card.

The HW configuration of the computer 10 described above is exemplary. Accordingly, the computer 10 may appropriately undergo increase or decrease of HW devices (e.g., addition or deletion of arbitrary blocks), division, integration in an arbitrary combination, and addition or deletion of the bus. For example, the server 1 may omit at least one of the I/O device 10e and the reader 10f.

In addition to the HW configuration illustrated in FIG. 11, the computer 10 may also include multiple PSUs 6 as Illustrated in FIG. 2, and at least one of the multiple PSUs 6 may be connected with a UPS 7.

(2) Miscellaneous:

The technique according to the embodiment described above can be changed or modified as follows For example, in the power control unit 30 illustrated in FIG. 3, the functions of the obtaining unit 32, the determining unit 33, and the setting unit 34 may be merged in any combination, or may each be divided respectively.

Further, the example of FIG. 2 assumes that the server 1 receives power by two power source systems, but the present invention is not limited thereto. Alternatively, the server 1 may receive power by three or more power source systems. This means that the server 1 may be powered by two or more power sources.

Furthermore, the number of processors 2, the number of fans 4, the number of PSUs 6, the number of the UPSs 7, and the number of distribution boards 8 in the server 1 are not limited to those in FIG. 2.

In one aspect, the throughput of a processor connected to multiple power supplies can be enhanced.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A power control apparatus comprising:
a memory; and
a first processor coupled to the memory, the first processor being configured to:
control an operating frequency of a second processor connected to a plurality of power supply devices that receive power from one or more power source systems to an operating frequency corresponding to a power value based on information related to a number of power source systems in the plurality of power supply devices and information related to a number of uninterruptable power supplies connected to the plurality of power supply devices; and
control, in a case where the number of the power source systems is two or more, an uninterruptable power supply is connected to a power supply device in each of the power source systems, and each of the power source systems is operating normally, the operating frequency of the second processor to an operating frequency corresponding to a total value of a power value based on a number of power supply devices normally operating in a first power source system and a power value based on a number of uninterruptable power supplies in a second power source system different from the first power source system.

2. The power control apparatus according to claim 1, the first processor being further configured to:
control, in a case where the number of the power source systems is two or more, an uninterruptable power supply is connected to a power supplying device of each of the power source systems, and a power failure occurs in the one or more power source systems, the operating frequency of the second processor to an operating frequency corresponding to a power value based on a number of power supply devices normally operating in a power source system being normal among the power source systems.

3. The power control apparatus according to claim 1, the first processor being further configured to:
control, in a case where the number of the power source systems is one, the operating frequency of the second processor to an operating frequency corresponding to a power value based on the number obtained by subtracting one from a number of power supply devices normally operating in the power source system.

4. The power control apparatus according to claim 3, the first processor being further configured to:
control, in a case where the number of the power source system being one is caused from a power failure in one or more power source systems among the two or more power source systems, the operating frequency of the second processor to an operating frequency corresponding to a power value based on a number of power supply devices normally operating in a normal power source system within a predetermined time period from an occurrence of the power failure.

5. The power control apparatus according to claim 4, the first processor being further configured to:
control, in a case where a number of the power source systems is two or more and no uninterruptable power supply is not connected to the respective power supply devices of the power source systems, the operating frequency of the second processor to an operating frequency corresponding to a power value based on a number of power supply devices normally operating in the first power source system.

6. The power control apparatus according to claim 1, the first processor being further configured to:
store power value setting information in which a number of the power source systems, a number of the uninterruptable power supplies, and an operating frequency that is to be set in the second processor are associated with one another; and
control the operating frequency of the second processor to an operating frequency associated with the number of the power source systems and the number of the uninterruptable power supplies by referring to the power value setting information.

7. The power control apparatus according to claim 1, the first processor being further configured to:
determine the number of the power source systems based on a result of receiving a given signal in each of the plurality of power supply devices in each of the one or more power source systems, the signal being transmitted among the plurality of power supply devices in the power source system through a power line in the power source system, the power line being connected one to a power source provided each of the one or more of power source systems.

8. A method for power control implemented by a computer, the method comprising:
at the computer
controlling an operating frequency of a processor connected to a plurality of power supply devices that receive power from one or more power source systems to an operating frequency corresponding to a power value based on information related to a number of power source systems in the plurality of power supply devices and information related to a number of uninterruptable power supplies connected to the plurality of power supply devices; and
controlling, in a case where the number of the power source systems is two or more, an uninterruptable power supply is connected to a power supply device in each of the power source systems, and each of the power source systems is operating normally, the operating frequency of the processor to an operating frequency corresponding to a total value of a power value based on a number of power supply devices normally operating in a first power source system and a power value based on a number of uninterruptable power supplies in a second power source system different from the first power source system.

9. The method according to claim 8, further comprising at the computer
controlling, in a case where the number of the power source systems is two or more, an uninterruptable power supply is connected to a power supplying device of each of the power source systems, and a power failure occurs in the one or more power source systems, the operating frequency of the processor to an operating frequency corresponding to a power value based on a number of power supply devices normally operating in a power source system being normal among the power source systems.

10. The method according to claim 8, further comprising at the computer
controlling, in a case where the number of the power source systems is one, the operating frequency of the processor to an operating frequency corresponding to a power value based on the number obtained by subtracting one from a number of power supply devices normally operating in the power source system.

11. The method according to claim 10, further comprising at the computer
controlling, in a case where the number of the power source system being one is caused from a power failure in one or more power source systems among the two or more power source systems, the operating frequency of the processor to an operating frequency corresponding to a power value based on a number of power supply devices normally operating in a normal power source system within a predetermined time period from an occurrence of the power failure.

12. The method according to claim 8, further comprising at the computer
controlling, in a case where a number of the power source systems is two or more and no uninterruptable power supply is not connected to the respective power supply devices of the power source systems, the operating frequency of the processor to an operating frequency corresponding to a power value based on a number of power supply devices normally operating in the first power source system.

13. The method according to claim 8, further comprising at the computer
controlling the operating frequency of the processor to an operating frequency associated with the number of the power source systems and the number of the uninterruptable power supplies by referring to power value setting information from a storage area, the power value setting information associating a number of the power source systems, a number of the uninterruptable power supplies, and an operating frequency that is to be set in the processor with one another.

14. The method according to claim 8, further comprising at the computer
determine the number of the power source systems based on a result of receiving a given signal in each of the plurality of power supply devices in each of the one or more power source systems, the signal being transmitted among the plurality of power supply devices in the power source system through a power line in the power source system, the power line being connected one to a power source provided each of the one or more of power source systems.

* * * * *